H. A. TIMM.
AUTOMOBILE JACK.
APPLICATION FILED SEPT. 8, 1914.
1,156,945.
Patented Oct. 19, 1915.
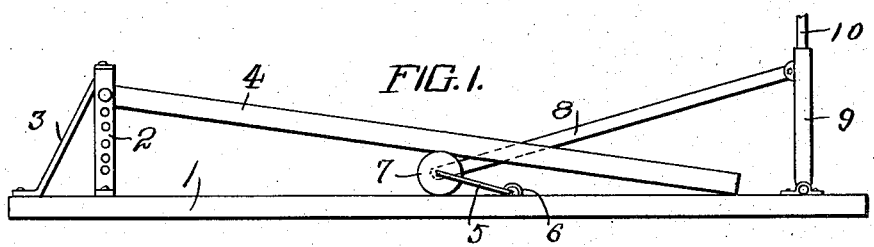
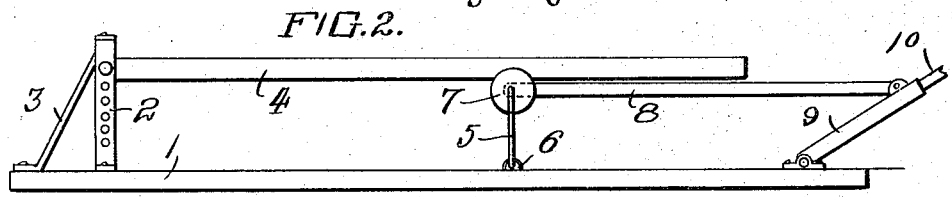
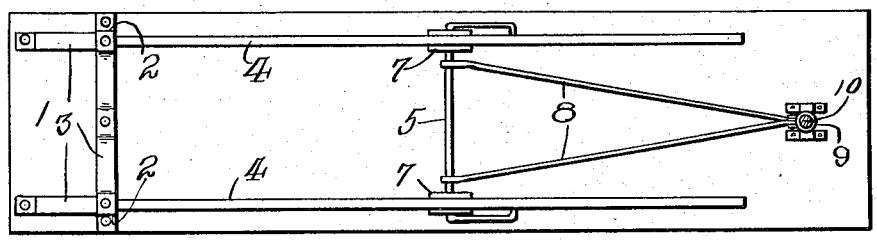
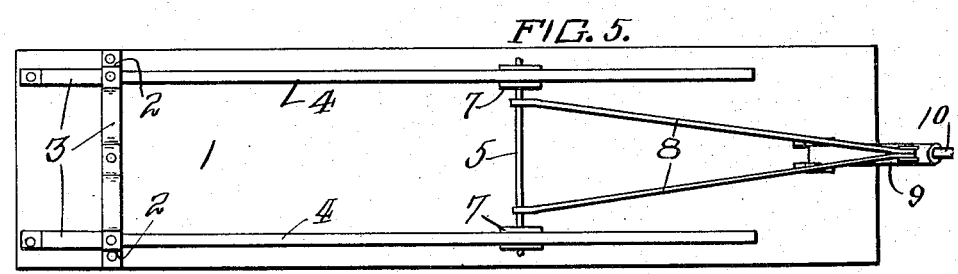
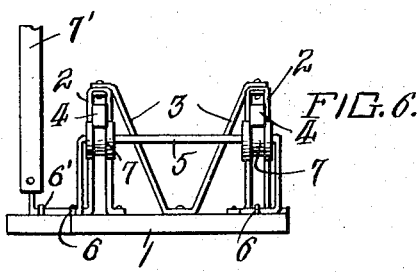
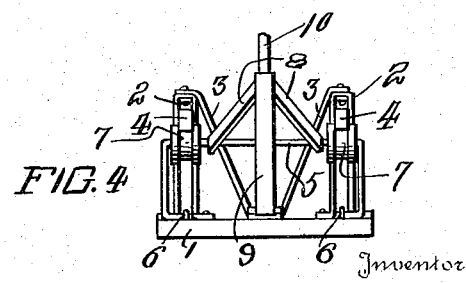
Inventor
H. A. Timm,

# UNITED STATES PATENT OFFICE.

HENRY A. TIMM, OF CALEDONIA, MICHIGAN.

AUTOMOBILE-JACK.

1,156,945.   Specification of Letters Patent.   Patented Oct. 19, 1915.

Application filed September 8, 1914. Serial No. 860,668.

*To all whom it may concern:*

Be it known that I, HENRY A. TIMM, a citizen of the United States, residing at Caledonia, in the county of Kent, State of Michigan, have invented certain new and useful Improvements in Automobile-Jacks; and I do hereby declare the following to be a full, clear, and exact description of the invention, such as will enable others skilled in the art to which it appertains to make and use the same.

This invention relates to an automobile jack.

An object of the invention is to provide a device of this character by means of which the body of an automobile may be lifted from the ground.

A further object of the invention is to so construct the device that the same will be readily transportable and easily operated.

A still further object of the invention is to so construct a jack that the same may be inserted below the axle of a machine at various distances and thus control the height the machine is to be raised from the ground.

A still further object is to provide a device by means of which a vehicle may be raised from the ground irrespective of the distance of the axle from the ground.

With these and other objects in view, such as will appear as the description progresses, my invention comprises the combination and arrangement of parts as herein set forth and subsequently claimed.

Referring to the drawing: Figure 1 is a side elevation of the device when the parts are in their lowered positions. Fig. 2 is a similar view showing the parts in their raised positions. Fig. 3 is a plan view of the device. Fig. 4 is an end view. Fig. 5 is a plan view of the device showing the position the operating lever will assume when the side rails are raised. Fig. 6 is an end view of a modification of the device.

Referring to the drawing wherein like parts are indicated by like characters throughout the several views: My device comprises a flat base plate 1 made of wood or any desirable material and having on one end thereof upwardly extending bearing members 2 which are braced by downwardly extending diagonal strips 3 certain of which are secured to the rear of the said bearing members and the others of which are secured between the said bearing members.

Pivotally mounted on each of these bearing members 2 is a lifting rail 4 which extends from the said bearing members backwardly on the base plate 1 to a point adjacent the end thereof. The lifting rails are parallel to each other and to the edge of the base plate 1. Supporting the rear ends of these rails 4 is an inverted U-shaped member 5, the legs of which are pivotally supported on the base plate 1, as at 6. On the bight portion of this member 5 is located two spaced roller bearings 7 which are operable on the lower surfaces of the rails 4. In order that this U-shaped member 5 may be swung about its pivot 6 to raise or lower the rails 4, I have secured to the bight portion of the member 5 between the roller bearings 7 outwardly extending converging arms 8 which are secured at their ends to a socket member 9 in which is detachably mounted an operating lever 10.

In operation the device is placed beneath the axle of a vehicle so that the raising rails 4 extend at right angles thereto and the base plate 1 is in contact with the ground. At this time the arms of the member 5 lie in contact with the upper face of the base plate 1 and the roller bearings 7 rest upon the said base plate while the guide rails 4 rest upon the roller bearings in proximity to the upper face of the said base plate 1. The operating lever 10 is then swung upwardly so that the member 5 is swung about its pivot 6 and thus the bight portion of this member 5 moves about an arc with the roller bearings 7 riding upon the rails 4 and consequently the rails are gradually raised about their pivotal points in the bearings 2 until the arms of the member 5 assume a vertical position at which time the vehicle is raised from the ground and is held in such position.

In the modification of my device the means for raising and lowering the rails is somewhat changed for it is found convenient in some cases to use a device of this character. The raising rails 4 are pivoted to the base plate 1 in a manner similar to that in which they are secured in the preferred form of my invention, but instead of having the converging members 8, the socket 9 and the operating lever 10, I have secured to one of the downwardly extending arms of the U-shaped member 5 an outwardly extending angular arm 6' to the end of which is secured a removable handle 7' parallel to the adjacent leg of the member 5. This form is very convenient in some instances where it is impossible to swing the lever 10 of the preferred form and for this reason I do not wish to be limited to either forms shown.

From the foregoing description it may be seen that I have provided an automobile jack by means of which a vehicle may be lifted from the ground at any desirable distance and I have so constructed the device that it may be inserted under the axle of the vehicle irrespective of the distance of the axle from the ground and may be successively operated to raise the particular vehicle from the ground.

While I have described and illustrated a particular embodiment of my invention, I wish it to be understood that I do not wish to be limited to that particular embodiment for it is obvious that numerous changes may be made within the scope of the invention as defined by the claim.

What is claimed is:—

An automobile jack comprising, a base plate, bearings secured to one end of said base plate, rails pivotally secured to said bearings and in spaced relation to each other, an inverted U-shaped member pivotally secured to the other end of the base plate beneath the free end of the rails, roller bearings mounted on said U-shaped member and arranged to contact with the lower faces of the rails and means secured to said U-shaped member to raise the rails about their pivots and maintain the same in their raised positions.

In testimony whereof, I affix my signature, in the presence of two witnesses.

HENRY A. TIMM.

Witnesses:
 FRED MARLEY,
 EHNER ROWLAND.

Copies of this patent may be obtained for five cents each, by addressing the " Commissioner of Patents, Washington, D. C."